Nov. 9, 1943.  L. E. DEMPSEY ET AL  2,333,642
BICYCLE CONSTRUCTION
Original Filed Sept. 6, 1938  5 Sheets-Sheet 1
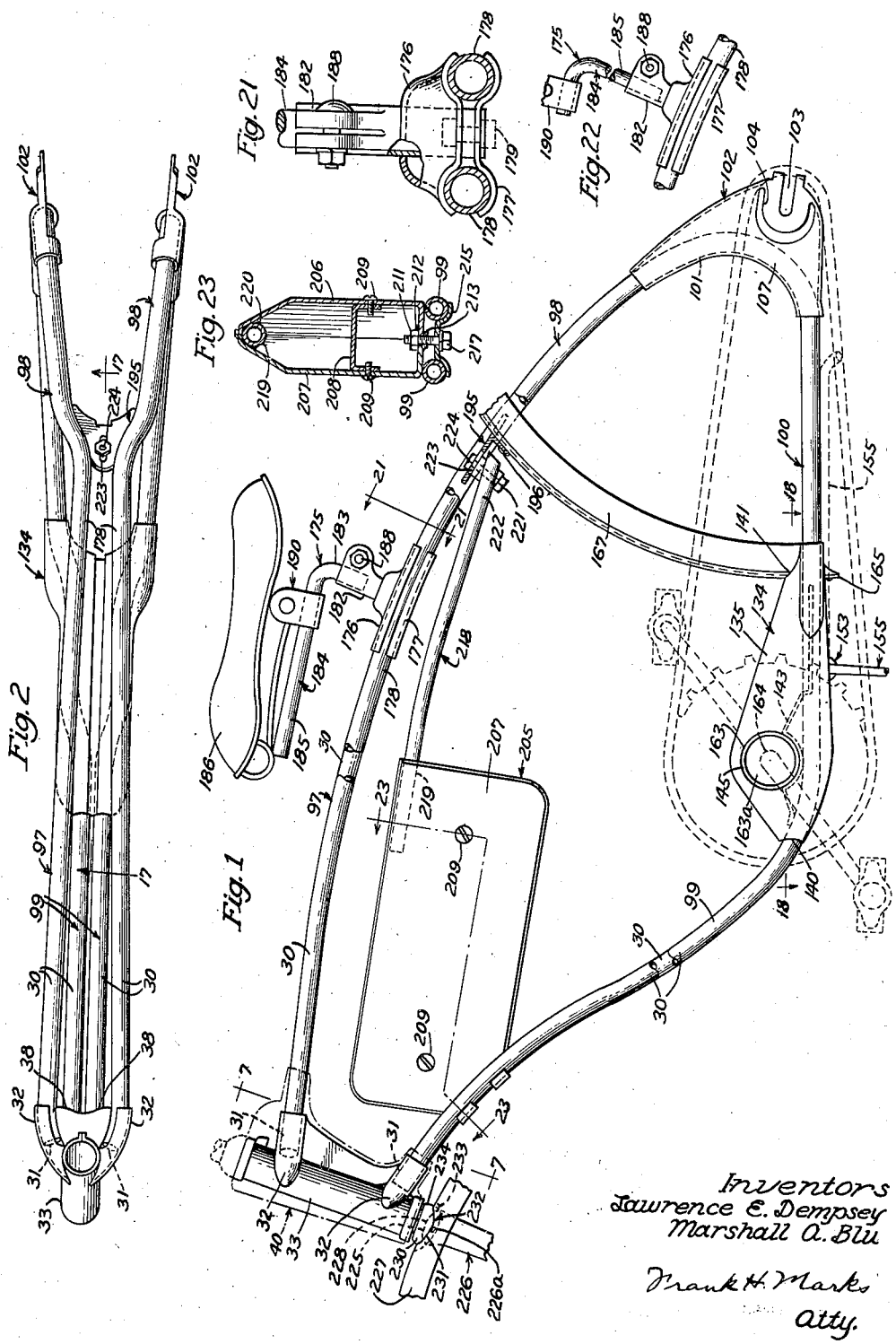
Inventors
Lawrence E. Dempsey
Marshall A. Blu
Frank H. Marks
Atty.

Nov. 9, 1943.                 L. E. DEMPSEY ET AL                 2,333,642
                              BICYCLE CONSTRUCTION
                       Original Filed Sept. 6, 1938      5 Sheets-Sheet 2
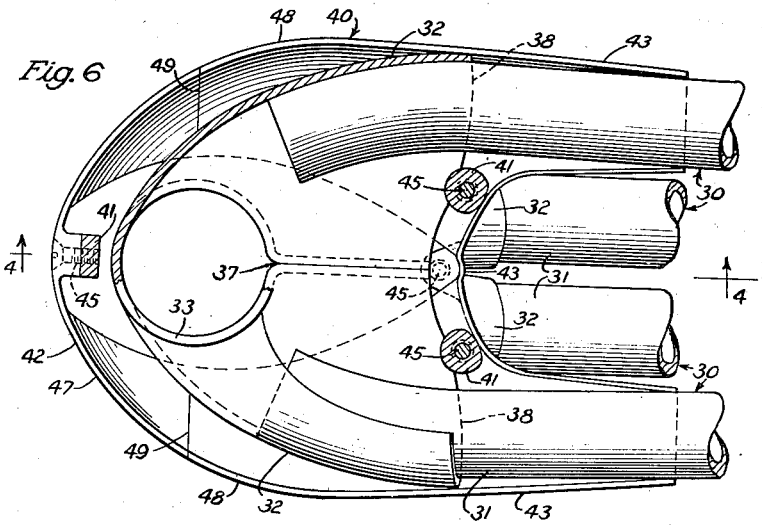
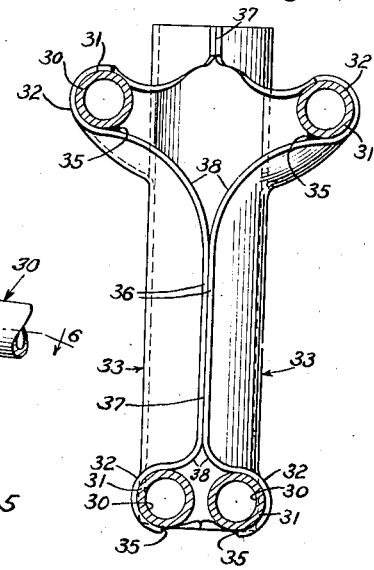
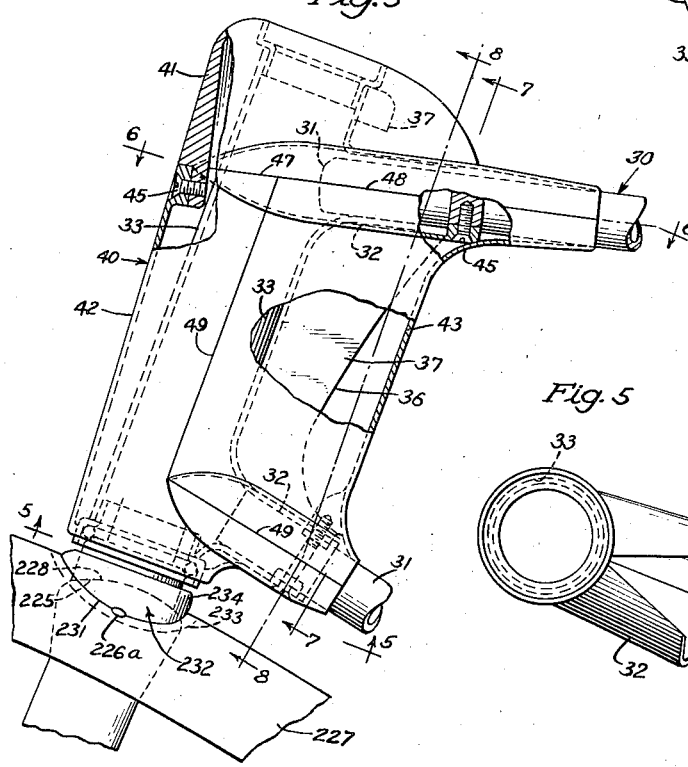
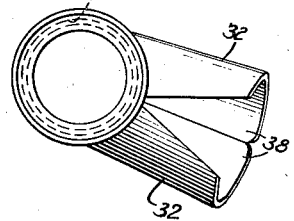
Inventors
Lawrence E. Dempsey
Marshall A. Blu
Frank H. Marks
atty.

Nov. 9, 1943.  L. E. DEMPSEY ET AL  2,333,642
BICYCLE CONSTRUCTION
Original Filed Sept. 6, 1938   5 Sheets-Sheet 3
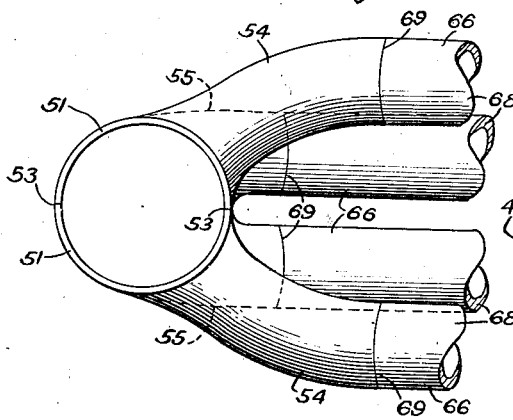
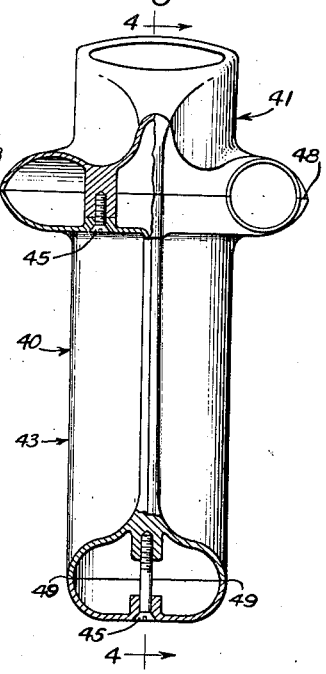
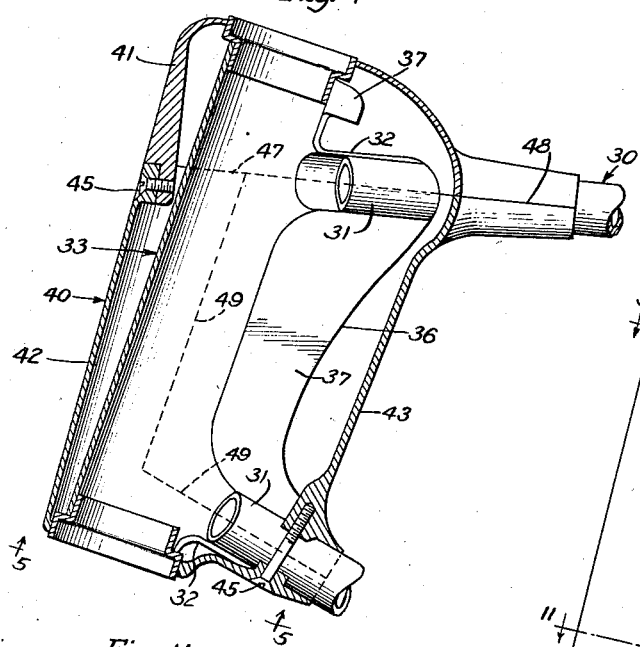
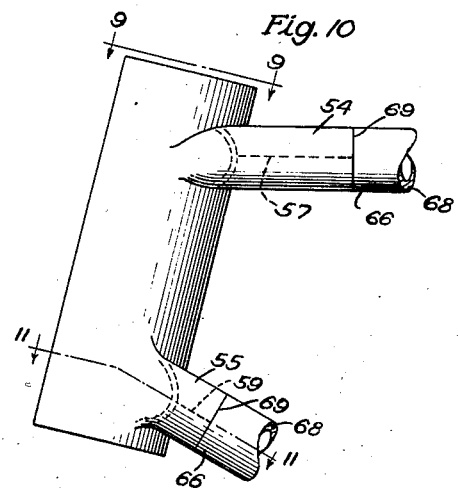
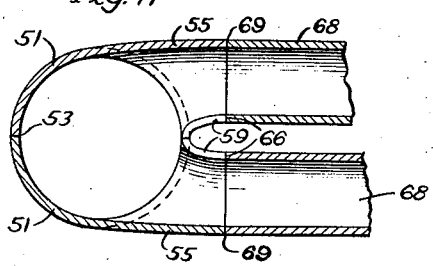
Inventors
Lawrence E. Dempsey
Marshall A. Blu
Frank H. Marks
Atty.

Nov. 9, 1943.  L. E. DEMPSEY ET AL  2,333,642
BICYCLE CONSTRUCTION
Original Filed Sept. 6, 1938    5 Sheets-Sheet 4
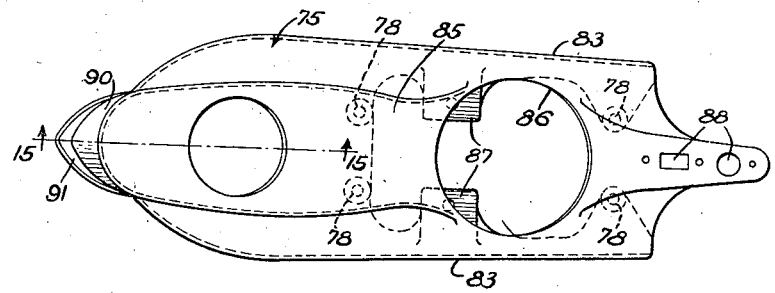
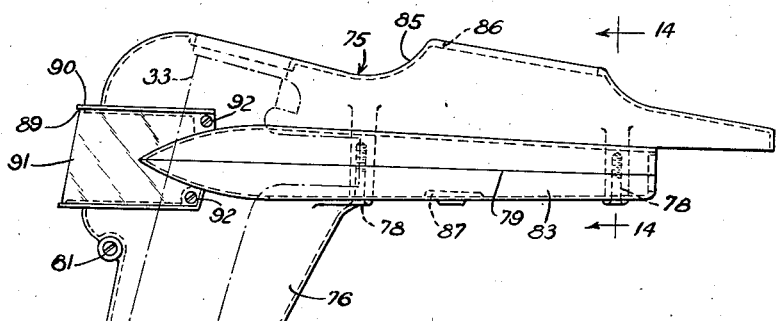
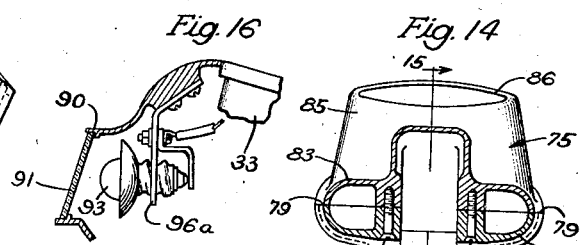
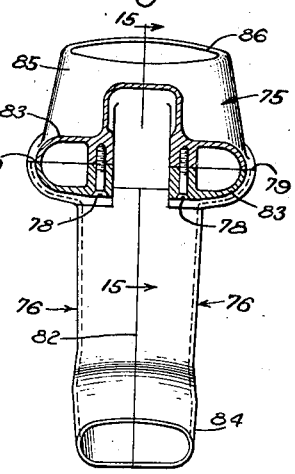
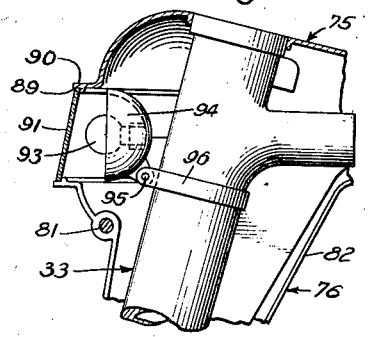
Inventors
Lawrence E. Dempsey
Marshall A. Blu
Frank H. Marks
Atty.

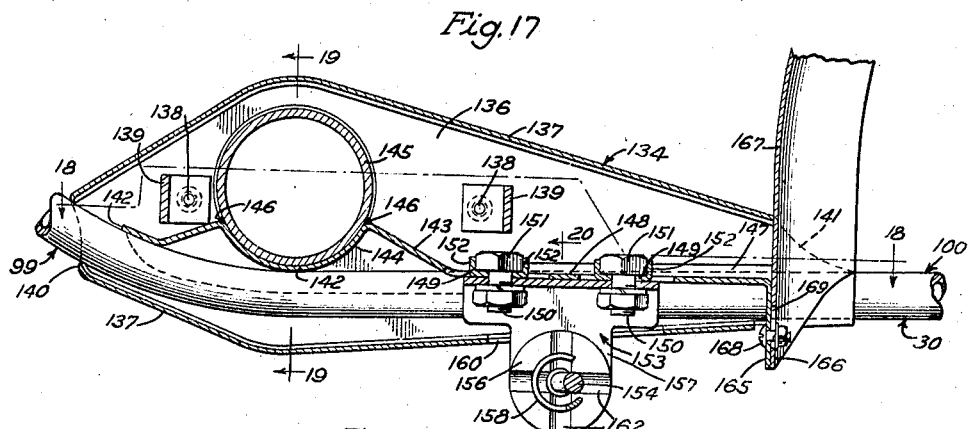
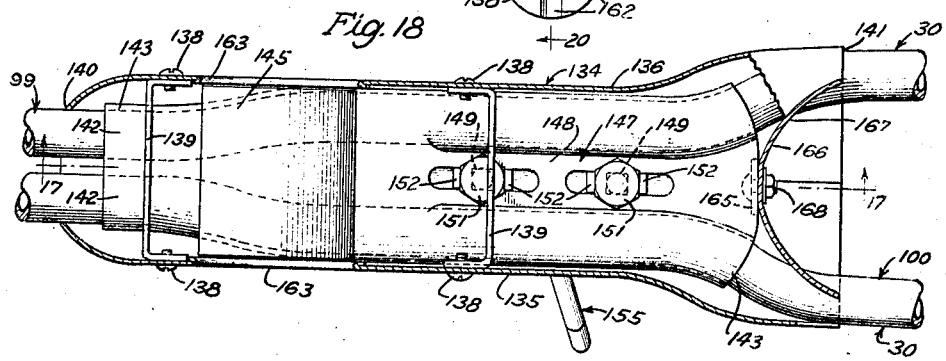
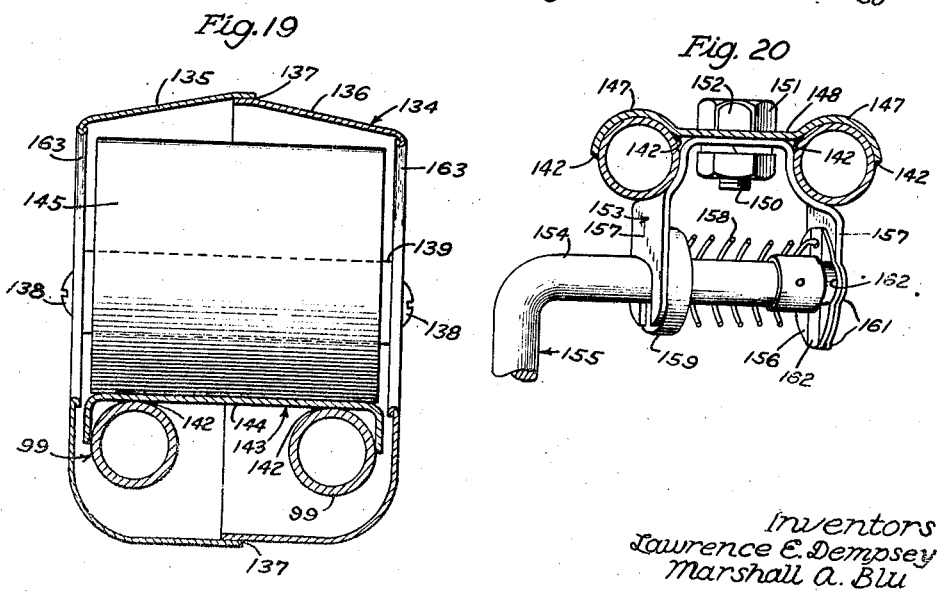

Patented Nov. 9, 1943

2,333,642

UNITED STATES PATENT OFFICE 2,333,642

BICYCLE CONSTRUCTION

Lawrence E. Dempsey, Oak Park, and Marshall A. Blu, Riverside, Ill., assignors to Sears, Roebuck and Co., Chicago, Ill., a corporation of New York Original application September 6, 1938, Serial No. 228,502. Divided and this application July 28, 1941, Serial No. 404,266

3 Claims. (Cl. 280—281)

This application is a division of our co-pending application Serial No. 228,502, filed September 6, 1938, entitled "Bicycle construction," now Patent 2,280,801, issued April 28, 1942.

This invention relates to frame and associated construction for bicycles and the like.

In the ensuing description and claims, the term bicycle is used for convenience as one type of conveyance to which the invention is applicable, but that term is not to be regarded as one of limitation, since the invention is applicable to other velocipedes, motorcycles and the like, as will be apparent to anyone skilled in the art.

It is an object of our invention to provide an improved spring frame for a bicycle.

It is another object to provide a bicycle in which welding and brazing burs are shielded from view, thereby eliminating the need for removing the burs.

A further object resides in the provision of a shroud which is ornamental and hides the juncture or junctures of connected parts.

It is another object to provide a full elliptical bicycle spring frame construction having its places of support at the ends of the major axis of the ellipse.

Another object is to provide a frame of this character in which the load is spread and excessive strain due to breathing, twisting and other causes is obviated.

It is also an object of the invention to provide an improved crank support.

A further object is to provide a tank for supplies, the tank being so mounted that it takes substantially no load.

Another object is to provide an improved seat support affording a variety of generally vertical and horizontal adjustments for a bicycle seat.

An object of the invention is to provide a tubular bicycle frame structure wherein the upper, lower and rear fork reaches will comprise primarily a transversely weldless continuous tubular formation which eliminates the necessity for the inclusion of a central tube or bridge strut.

A further object is to mount fenders, a tank and the like on a spring frame in such manner that breathing of the frame is not interferred with.

Further objects and advantages of the invention will appear as the description proceeds.

The invention will be understood more readily upon reference to the following description and the accompanying drawings (five sheets), in which:

Fig. 1 is a side elevation of a bicycle frame constructed in accordance with one form of the invention;

Fig. 2 is a plan view of the structure appearing in Fig. 1, certain parts being omitted for the sake of clarity;

Fig. 3 is an enlarged fragmentary view, partly in section and partly in elevation, of a shroud such as that appearing in dash-dot lines in Fig. 1, and an associated steering post journal and spring frame structure;

Fig. 4 is a fragmentary vertical sectional view taken as indicated by the line 4—4 in Figs. 6 and 8;

Fig. 5 is a bottom plan view taken as indicated by the line 5—5 in Figs. 3 and 4, the shroud being omitted;

Fig. 6 is an enlarged fragmentary plan section-elevation, taken as indicated by the line 6—6 in Fig. 3;

Fig. 7 is a sectional-elevation taken as indicated by the line 7—7 in each of Figs. 1 and 3, the shroud being omitted;

Fig. 8 is a section-elevation taken as indicated by the line 8—8 in Fig. 3, showing only the shroud;

Fig. 9 is a fragmentary plan view of a modified steering post journal and associated frame and construction, taken as indicated by the line 9—9 in Fig. 10;

Fig. 10 is a reduced fragmentary side elevation of the structure appearing in Fig. 9;

Fig. 11 is a fragmentary sectional view taken as indicated by the line 11—11 in Fig. 10;

Fig. 12 is a plan view of a modified shroud incorporating an instrument panel;

Fig. 13 is a side elevation of the structure appearing in Fig. 12;

Fig. 14 is a sectional view taken as indicated by the line 14—14 in Fig. 13;

Fig. 15 is a fragmentary sectional view taken as indicated by the line 15—15 in each of Figs. 12 and 14;

Fig. 16 is a view similar to Fig. 15 but showing the lamp mounted on the shroud;

Fig. 17 is an enlarged fragmentary sectional view taken as indicated by the line 17—17 in Figs. 2 and 18;

Fig. 18 is a plan sectional view taken as indicated by the line 18—18 in Figs. 1 and 17;

Fig. 19 is an enlarged sectional view taken as indicated by the line 19—19 in Fig. 17;

Fig. 20 is an enlarged sectional view taken as indicated by the line 20—20 in Fig. 17;

Fig. 21 is an enlarged fragmentary sectional view taken as indicated by the line 21—21 in Fig. 1;

Fig. 22 shows the seat structure of Fig. 1 in a different adjustment; and

Fig. 23 is an enlarged sectional view taken as indicated by the line 23—23 in Fig. 1.

Referring now more particularly to Figs. 1 to 7, there is provided in accordance with one form of the invention a pair of one-piece tubular spring frame members 30 of generally elliptical form disposed in general symmetrical relation on opposite sides of the median longitudinal plane of a bicycle, the ends 31 of each spring being disposed in sockets 32 extending rearwardly from the steering post sleeve or journal 33. The ends 31 are suitably joined to said sockets as by welding or brazing 35.

The journal 33 may be of sheet metal such as sheet steel and affords longitudinal seam portions 36 which may be joined by welding, if desired, forming gusset portions 37 of considerable area and strength. The gusset may extend in a generally vertical plane dividing the sockets into right and left pairs. The sockets are joined to the gusset by gusset arms 38 of preferably arch-like form. The gusseting thus serves to brace the ends of the springs in relation to one another and the sleeve and, in conjunction with the sockets and the remainder of the sleeve, prevents excessive strain of the sleeve and breathing of the springs at the forward ends thereof, vertically, laterally and torsionally, and distributes the load over a substantial area. Because of this gusseting and socket construction, a journal of relatively thin, light material may be employed. There is provided accordingly a journal and frame coupling which combines lightness, economy, ruggedness and rigidity.

In order that the necessity for grinding burs off may be obviated, as well as to provide an improved appearance, the sleeve 33 and the connections between it and the frame springs may be shielded by a shroud in such manner, preferably, that it takes no load. The shroud is preferably formed by die casting, but may be made of any suitable plastic, phenolic condensation product, sheet metal, papier mâché or any other suitable material. It may take various forms, of which some examples are included herein. The shroud shown at 40 may be formed of three pieces comprising a top section 41, a front and lower section 42 and an intervening rear section 43, as is clearly seen in Fig. 3. The shroud may be chromium plated or may have any other suitable ornamental finish, and its sections joined by any suitable means such as the screws 45 engaged with suitably arranged cooperating lugs on the respective sections, the sections 41 and 42 having a juncture at the line 47, the sections 41 and 43 coming together at the line 48 and the sections 42 and 43 coming together at the lines 49. These sections may be readily assembled and, as is evident from the drawings, serve to fully shield the sleeve 33, the spring frame ends 31 and all welding or brazing burs at the junctures of the sleeve and ends.

A modified post sleeve and spring frame construction is shown in Figs. 9, 10 and 11. In this structure, the sleeve may be formed of two sections comprising a pair of members 51, said members having arcuate portions welded together as at 53 to form a steering post sleeve. Each member 51 has a pair of hollow rearwardly extending upper branches or wings 54 and a pair of hollow rearwardly extending lower branches or wings 55, the several branches or wings being stamped or pressed to tubular form and welded or brazed together along inwardly facing seams indicated by the dotted lines 57 and 59 in Fig. 10. To the several sleeves 54 and 55, the ends 66 of the tubular frame springs 68 are welded as at 69.

Another form of shroud construction appears in Figs. 12 to 15, and comprises a top section 75 adapted to enclose the upper part of the front post sleeve 33 and two symmetrical lower sections 76, the top section being joined to the lower sections by any suitable means such as the screws 78 and meeting said lower sections along the lines 79, and the lower sections being joined together by any suitable means such as the screws 81 and meeting along the lines 82. The shroud affords sleeves 83 enclosing the upper sockets 32 of the front post sleeve 33 and is formed to receive the upper forward portions of the frame springs back of the ends thereof, and said shroud provides a lower housing portion 84 which encloses the lower sockets 32 of the post sleeve 33. The upper section 75 of this shroud is of sufficient extent to house a speedometer, for example, horn or other suitable equipment, in the portion 85 thereof, and accordingly may have an opening 86 for the speedometer dial. The section 75 may be provided with suitable anchorages 87 for fastening the speedometer or other instrument in place, and may also provide for the mounting of switches as at 88. It will be understood that the section 75 may be of any suitable form to accommodate such instruments and other apparatus as may be desired.

The sections 75 and 76 provide an opening 89 affording a frame 90 in which a headlight lens 91 may be mounted as by means of the screws 92. Within the shroud a lamp 93 may be mounted in a suitable reflector 94 which may be pivotally adjusted at 95 on a strap 96 secured to the front post sleeve 33 as shown in Fig. 15 or secured to the shroud as by a bracket 96ᵃ, Fig. 16, or mounted in any other suitable manner.

The frame comprises an upper reach portion or backbone 97, an upper rear wheel fork 98, a lower reach portion 99 and a lower rear wheel fork 100.

A crank support embodying features of the invention appears in Figs. 17 and 20, and comprises a housing 134 formed of two complemental shells 135 and 136 which may be telescoped together as at 137 and held in assembly as by screws 138 and associated brackets 139. The housing has front and rear openings 140 and 141, respectively, for the passage of the intermediate portions of the lower reaches 99 of the springs 30. Bracing apart and secured as by welding 142 to said portions of the springs is a bracket 143 affording a cradle 144 in which is secured a bearing sleeve or journal 145 as by welding 146. The bracket 143 has a channel 147 depending between the reaches 99, and in its web 148 are bolt holes 149 through which bolts 150 depend. The heads 151 of said bolts may be held from turning as by lugs 152 which may be struck from the web 148. The bolts support a housing or hanger 153 to which an offset arm 154 of a kick stand 155 may be adjustably pivoted. The arm 154 carries a disc 156 which is pressed against an ear 157 of the hanger by a spring 158 having an end in a cup 159 secured to the other ear 157, said ears extending through a hole 160 in the crank housing 134. The first ear 157 has depressions 161 and the disc has one or more projections 162 engageable selectively in certain of the depressions 161 to selectively and yieldably retain the stand 155 in ground-engaging position as shown in Figs. 1, 24 and 26 or in inoperative position as shown in dotted lines in Fig. 1.

The journal 145 is arranged with its axis extending transversely of the housing, the shells having openings 163 affording clearance for the passage therethrough of the movable bearing sleeve mechanism 163a (Fig. 1) associated with the crank 164.

The cradle bracket 143 extends throughout a substantial distance along and is securely brazed or welded to the lower reaches 99 of the springs, so that the load is distributed along the frame and the torsional and other effects resulting from pedaling are effectively withstood.

The bracket 143 may have a dependent rear portion 165 to which the lower end 166 of a rear mud guard 167 may be anchored as at 168. The guard is preferably slotted at 169 to allow for lost motion when the spring frame breathes and to insure a good fit notwithstanding dimensional differences arising in manufacture.

A form of seat or saddle support embodying the invention is shown generally at 175 (Figs. 1, 21 and 22) and comprises upper and lower jaws 176 and 177 adapted to slidably receive the portions 178 of the upper reach 97 of the frame, suitable means such as a bolt and nut 179 being employed to securely clamp the jaws in place. It will be noted that the associated parts 178 of said springs are parallel as seen in Fig. 2, so that the sections 176 and 177 may be slid longitudinally along said springs for a substantial distance, and, as pointed out, may be clamped in any desired position by the bolt and nut 179 or equivalent means.

The upper jaw 176 securely carries an upstanding sleeve 182 adapted to receive an arm 183 of an angular post 184 on the other arm 185 of which a seat or saddle 186 may be clamped adjustably. The sleeve 182 has suitable clamping means 188 for adjustably securing the post 184 at various heights, and the seat 186, through its clamping means 190, is securely held in any position substantially throughout the length of the bracket arm 185. It is thus apparent that the seat 186 may be adjusted forwardly and rearwardly by virtue of the adjustment of the jaws 176, 177, along the spring portions 178 and of the similar relation between the seat clamp 190 and the post arm 185. It is also evident that by manipulation of the adjusting means 188 the seat may be disposed at different heights.

It will be noted that the arms of the post 184 are of unequal length. Instead of securing the arm 183 in the sleeve 182, the arm 185 may be secured therein and the arm 183 arranged to extend forwardly, substantially as shown in Fig. 22. With this arrangement, the range of vertical adjustments of the seat on the post is increased in relation to the range afforded in the arrangement shown in Fig. 1.

A gusset 195 welded or otherwise suitably secured at the forward end of the upper rear fork 98, formed by the divergent rearwardly disposed upper portions of the springs 30, preferably has a dependent portion 196 to which the adjacent part of the rear wheel mud guard 167 is secured.

A tank 205 for tools and other equipment may be provided. The tank may take various forms. As illustrated, the tank may comprise complemental shells 206 and 207 held in assembly and reinforced by brackets 208 and screws 209. It may occupy any suitable location and, as shown, is conveniently supported by the forepart of the lower reach 99 of the frame and a rear part of the upper reach 97.

The tank shells are arranged to rest on the upper sides of the bars 30 at the lower reach 99, and one of the shells may be tapped, or nuts 211 may be welded or brazed as at 212 to the inner face of one of the shells, such as the shell 206, said shells affording slots 213 in line with the threads in the nuts. Brackets 215 embracing the lower sides of said bars have webs through which bolts 217 extend upward into the nuts.

A bar 218 has a portion 219 extending a substantial distance forwardly within the tank through a hole in the rear of the tank and welded or brazed as at 220 to the shell 206. A bolt 221 extends up through the rear end 222 of the bar 218 and through a longitudinal slot 223 in the fork gusset 195 and into a nut 224 so as to anchor the bar to the frame while affording lost motion so that breathing of the spring frame will not be interfered with and the tank and bar will take no load. The slotted construction also is advantageous since the same tank unit is thereby attachable to frames of different sizes. Moreover, dimensional differences arising in manufacture will not interfere with attachment of the tank units.

Upon removal of the screws 209 in the shell 207, the shell 207 may be removed to permit deposit and removal of articles relative to the tank. The shell 207 may be readily clamped in assembly with the shell 206 upon replacement of the removed screws, the slots 213 in the shell 207 clearing the shanks of the bolts.

The bight 225 of the front fork 226 may be secured as at 226a and shielded under the front fender 227, and welded, brazed or otherwise suitably united as at 228 to a steering post 230 which passes up through a hole 231 in the fender. A collar or cup 232 has a flange 233 which may be welded, brazed or secured by the means 226a to the underside of the fender and has a portion 234 projecting up through the hole and embracing the steering post. Thus the fender and collar conceals all burs or other unsightliness at the juncture of the bight 225 with the steering post 230, so that an improved appearance is obtained and metal finishing is not necessary.

It will be seen from the foregoing that we have provided a substantially full elliptical substantially unbridged reinforced spring frame construction which may include a continuous tube, with its forward vertex at the front post and its rear vertex at the rear axle, its lower reach supporting the crank substantially centrally or elsewhere between said vertices, while its upper reach supports the seat substantially centrally or elsewhere between said vertices. The construction is particularly sturdy at the vertices and at the crank support, the forward ends of the springs being rigidly joined to the steering post journal, and the rear vertices of the springs being integrally united with the rear axle brackets. The steering post journal may be covered with an aesthetic metal or other shroud which is readily and securely applied and removed and covers welded, brazed or other joints, making the cleaning of welds unnecessary and thereby expediting the manufacture of the finished article and at the same time improving its appearance. The bight of the front fork may likewise be shielded. The crank is supported in a readily assembled and securely mounted housing over the lower reach of the elliptical frame. Unusual ranges of horizontal and vertical adjustment of the seat are afforded.

Various modifications coming within the spirit of our invention may suggest themselves to those skilled in the art, and hence we do not wish to be limited to the specific form shown or uses mentioned, except to the extent indicated in the appended claims, which are to be interpreted as broadly as the state of the art will permit.

We claim:

1. Bicycle construction comprising a one-piece steering post sleeve having a longitudinal flat seam in the form of a gusset at the rear side thereof, vertically spaced portions of said sleeve adjacent said seam being bulged laterally and affording sockets joined to said seam by arched gussets, a frame construction having spaced forwardly extending upper ends and lower ends disposed in said sockets, and means integrally uniting said ends with said sleeve.

2. Bicycle construction comprising a steering post sleeve, a frame having forwardly extending upper and lower ends, means uniting said ends to said sleeve, a shroud in fixed relation to and enveloping said sleeve and ends, said shroud having a headlight lens, a lamp mounted at the rear of said lens, said shroud comprising an upper section formed to enclose the upper end of said sleeve and the top of the upper frame end, a pair of complemental side sections covering the lower side of the upper end of the frame, the remainder of said sleeve and the lower end of the frame, and means joining said sections with their exposed surfaces substantially flush, all of said sections forming a frame for said lens.

3. Bicycle construction comprising a one-piece steering post sleeve having a longitudinal flat seam in the form of a gusset at the rear side thereof, vertically spaced portions of said sleeve adjacent said seam being bulged laterally and affording laterally spaced upper sockets and laterally spaced lower sockets joined to said seam by arched gussets, a frame construction having spaced forwardly extending upper ends and lower ends disposed in said sockets, and means integrally uniting said ends with said sleeve.

LAWRENCE E. DEMPSEY.
MARSHALL A. BLU.